United States Patent [19]
Baumann

[11] 3,848,240
[45] Nov. 12, 1974

[54] STORAGE SWITCH ARRANGEMENT

[75] Inventor: Eduard Baumann, Uster, Switzerland

[73] Assignee: Zellweger AG, Uster, Switzerland

[22] Filed: Mar. 26, 1973

[21] Appl. No.: 345,016

[30] Foreign Application Priority Data

Apr. 26, 1972 Switzerland ........................ 6154/72

[52] U.S. Cl. ......................... 340/174 R, 340/173 R
[51] Int. Cl. ............................................ G11c 11/06
[58] Field of Search ... 340/174 R, 173 CC, 173 LM

[56] References Cited

UNITED STATES PATENTS

| | | | |
|---|---|---|---|
| 3,355,594 | 11/1967 | Pinckaers | 340/174 R |
| 3,573,485 | 4/1971 | Ballard | 340/174 R |
| 3,716,844 | 2/1973 | Brodsky | 340/173 LM |
| 3,771,150 | 11/1973 | Schneider | 340/173 CC |

*Primary Examiner*—James W. Moffitt
*Attorney, Agent, or Firm*—Werner W. Kleeman

[57] ABSTRACT

A storage switch arrangement comprising a storage switch system incorporating an electronic switch element having associated therewith a control mechanism for at least temporarily storing the switching state of the storage switch system and having a storage or memory which retains its storage state at least for a predetermined time duration upon interruption of the power supply voltage.

7 Claims, 4 Drawing Figures

STORAGE SWITCH ARRANGEMENT

BACKGROUND OF THE INVENTION

The present invention relates to a new and improved storage switch arrangement.

In the remote-control art there are known constructions of remote-control receivers wherein an electro-mechanical decoding device is associated with an electro-mechanical switching device for carrying out remote-control commands. As the electro-mechanical switching device, there can be employed, for instance, a flip-flop switch driven by a servomotor or a so-called flip-flop relay or current surge switch having magnetic or mechanical holding of the switch position.

Although the known solutions have proven to be useful in a large number of remote-control receivers, the state-of-the-art proposals are basically associated with a number of drawbacks. For instance, the operational reliability of the contacts of such switching devices can be adversely affected by dust and atmospheric influences. Furthermore, these contacts are associated with unavoidable wear, for instance owing to burn-off of the contacts. Flip-flop relays and similar switching mechanisms also require precision in manufacture, resulting in increased fabrication costs. Such flip-flop relays only can be constructed to a limited extent so as to be resistant against vibrations. Finally, in a great many fields of application, the unavoidable development of noise which is present with mechanical switching devices and also the formation of sparks which constitutes a danger for explosions, is of decisive disadvantage.

SUMMARY OF THE INVENTION

Hence, it is a primary object of the present invention to provide an improved storage switch arrangement which is not associated with the aforementioned drawbacks of the prior art constructions.

Another and more sepcific object of the present invention relates to a new and improved construction of electronic switching device which can be employed instead of the aforementioned electro-mechanical switching devices and which does not exhibit the drawbacks thereof.

Since conventional electronic switches, such as thyristors, triacs and so forth, lose their conductive state even in the presence of brief power breakdown, it is not possible to simply carry out a replacement of the aforementioned electro-mechanical switching devices by such electronic switches, such as thyristors, and triacs. The output switch of a remote-control receiver must be capable of retaining the position which it last assumed in response to the last-received remote-control command, even if there temporarily occurs interruption in the network voltage or power supply.

Hence, for the purpose of overcoming this difficulty, the invention proposes providing an electronic switch with a static memory for the momentarily desired switching state so that the electronic switch, after the power supply is again switched on, can be placed into the previously assumed switching state. In particular, there is provided such a static memory or storage which does not lose its storage or memory state even in the presence of a temporary breakdown in the network or supply voltage.

Hence, in its more specific aspects, the invention concerns a new and improved construction of storage switch arrangement which is manifested by the features that there is provided a control mechanism associated with an electronic switching element for the purpose of at least temporarily storing the switching state of the storage switch and having a storage element or storage which retains its storage state at least for a certain time duration even upon interruption of the power supply or supply voltage.

A further aspect of the invention contemplates the use of the aforementioned storage switch system in a remote-control receiver for carrying out remote-control commands.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

At this point it is firstly remarked that in accordance with the present invention there is provided for the control mechanism a storage element or memory which at least temporarily does not lose the stored information even in the case of interruption or breakdown of the power supply energy. Suitable as such storage elements are, for instance, the known magnetic storages or memories. Such storages can be in the form of magnetic core memories having ring cores, transfluxors or thin-film storages. In this regard attention is directed to the publication Steinbuch: Taschenbuch der Nachrichtenuerarbeitung, Second Edition, pages 233, 433, 457. Furthermore, for purposes of the invention, there also can be employed as suitable storage elements the so-called amorphon semiconductors. In this regard, attention is directed to: Proc. IEEE, Vol. 59, No. 2, February 1971, pages 323–324, "An Amorphon Semiconductor RF-Switch and OVIONIC, Partially Extinguishable Or Variable Storages RM-256;" publication of the concern Energy Conversion Devices Inc., 1675 West Maple Road, Troy, Michigan, 48084, USA.

Additionally, there are suitable for storage times in the order of magnitude of hours also extremely high-ohm RC-elements as such can be realized, for instance, with the use of MOS-field-effect transistors and high-grade capacitors, especially electrochemical capacitors of the commercially available type ESD, from Gould's Ionics Company. (In this regard, attention is invited to "Control Engineering," Publication No. 1971, page 49, entitled "Electrochemical Capacitor Suggested for IC-Power Backup."

Figure 1:
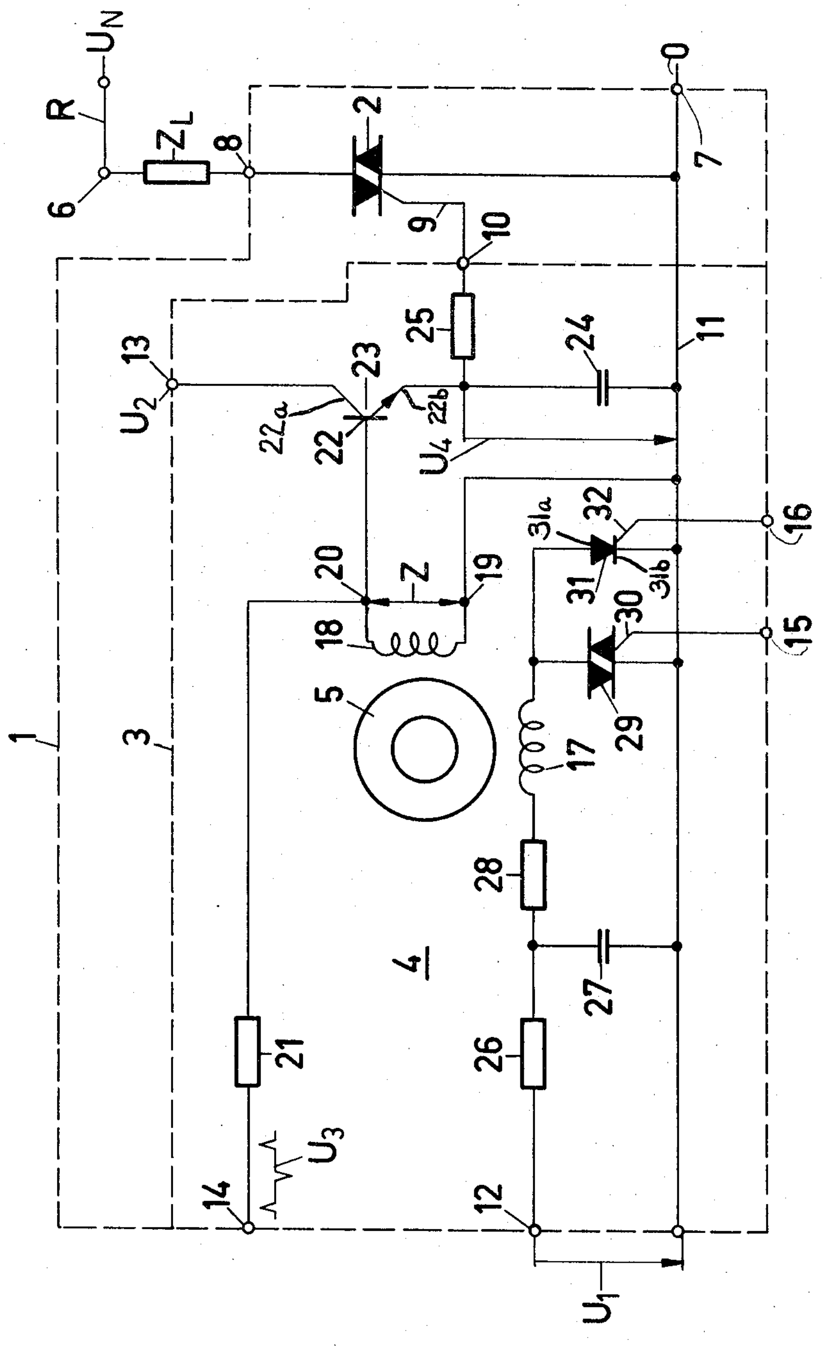
FIG. 1 is a circuit diagram of a first exemplary embodiment of storage switch system designed according to the teachings of the present invention.

Turning therefore now specifically to the exemplary embodiments of the invention, there will be initially considered in conjunction with the illustration of FIG. 1, a first exemplary embodiment having a magnetic storage or memory. The storage switch system or circuit 1 contains an electronic switching element 2, for instance a triac. This switching or switch element 2 has operatively associated therewith a control mechanism or device 3. The control mechanism 3 contains a storage or memory 4 having a magnetic ring core 5. In the case of this first exemplary embodiment, it is assumed that the storage switch system or circuit 1 serves to close or open a load current circuit having a load impedance $Z_L$. The load current circuit is located between a terminal 6, which for instance is connected with a phase conductor R of a heavy-current or power network, and a terminal 7 which is connected with a ground conductor 0 of such heavy-current or power network. The electronic switching element 2 is located between an output terminal 8 and the terminal 7 of the storage switch system 1. A control electrode 9 of the switch element 2 is operatively coupled with an output terminal 10 of the control mechanism or control circuit 3, whereas a minus-collecting rail or ground bus bar 11 of the control mechanism 3 is connected with the terminal 7 which is coupled with the null conductor 0 of the heavy-current or power network.

For operating the control mechanism 3 there are delivered thereto different supply voltages, and specifically at terminal 12 a DC-voltage $U_1$, at terminal 13 a DC-voltage $U_2$ and at terminal 14 an AC-voltage $U_3$. The AC-voltage $U_3$ preferably has a pulse-shaped curve or course, as such has been schematically indicated in FIG. 1. Such pulse-shaped voltage course can be generated by conventional means from a sinusoidal-shaped alternating-current voltage of the heavy-current network. The supply voltages $U_1$, $U_2$ and $U_3$ can be generated in known manner from the network alternating-current voltage.

The control pulses for switching-in or "ON" the storage switch system 1 can be delivered to the latter via a terminal 15. Control pulses for switching-out or "OFF" the storage switch system 1 can be delivered to the latter via a further terminal 16.

The ON-state of the storage switch system or circuit 1 and its switch element 2, brought about through the infeed of a control pulse at the terminal 15, lasts as long as there are present the supply voltages $U_1$, $U_2$ and $U_3$ and the network voltage $U_N$. In the case of interruption or breakdown of the network voltage $U_N$ and the supply voltages $U_1$, $U_2$ and $U_3$ which are derived therefrom, the switch element 2 assumes its non-conductive state, but however again automatically returns back to the ON-state which it assumed prior to the interruption of the supply voltage as soon as the aforementioned voltages are again present.

The OFF-state of the storage switch system 1 and its switch or switching element 2, and which is brought about through the infeed of a control pulse at the terminal 16, is maintained for such time as the supply voltages $U_1$, $U_2$ and $U_3$ and the network voltage $U_N$ are present.

Upon breakdown or interruption of the network voltage $U_N$ and the supply voltages $U_1$, $U_2$ and $U_3$ derived therefrom, the switching element 2 remains in its non-conductive state and retains such also upon the reoccurrence of the network voltage $U_N$ and the supply voltages $u_1$, $U_2$ and $U_3$. The manner in which this is realized will be described more fully hereinafter.

The magnetic ring core 5 of the storage or memory 4 has operatively associated therewith a recording-and erasing coil or winding 17 and a reading coil or winding 18. If the ring core 5 is in its demagnetized state, then the impedance Z, appearing across the terminals 19 and 20 of the reading coil 18, is high-ohmic. If, however, the ring core 5 is placed into its magnetically saturated state, then the impedance Z is, for instance, less-ohmic by a number of magnitudes than in the case of the demagnetized ring core 5. With the aid of the recording-and erasing coil 17 and the switching elements associated therewith, it is possible to set the magnetic state of the ring core.

The AC-voltage $U_3$ which appears at the terminal 14 also appears across a voltage divider comprised of a high-ohm resistor 21 and the impedance Z of the reading coil or winding 18. With unsaturated ring core 5 the impedance Z is also high-ohmic, so that a considerable part of the voltage $U_3$ appears at the terminal 20. This terminal 20 is electrically coupled with the base 22 of a switching transistor 23, the collector 22*a* of which has applied thereto, via the terminal 13, the supply voltage $U_2$. The switching transistor 23 is periodically rendered conductive by the voltage appearing at terminal 20, so that a capacitor 24 which is located at its emitter circuit 22b is charged. Owing to the thus generated voltage $U_4$ appearing across the capacitor 24, a positive voltage is delivered via a resistor 25 to the control electrode 9 of the switch or switching element 2, with the result that switching element 2 is then placed into its conductive state. The storage switch system 1 is therefore placed into its ON-state. As long as the ring core 5 is in its unsaturated state, there is retained such ON-state and it immediately returns back thereto after any possible voltage interruption.

If, however, the ring core 5 is brought into its saturated state, then the impedance Z becomes very low-ohmic and the portion of the voltage $U_3$ then appearing at the terminal 20 is no longer sufficient to render the switching transistor 23 conductive. The voltage $U_4$ at the capacitor 24 disappears and the electronic switching element 2 is accordingly placed into its nonconducting state and remains in this state as long as the ring core 5 is saturated, irrespective of whether the network voltage $U_N$ and the supply voltage $U_1$, $U_2$ and $U_3$ derived therefrom are present or not.

For setting the desired state or condition of the magnetic ring core 5, there are associated therewith the recording- and erasing coil or winding 17 and further switching elements. Through the agency of a high-ohm resistor 26, a charging capacitor 27 is charged by the voltage $U_1$. The recording- and erasing coil 17 possesses an inductance L and a loss resistance 28. By means of the recording- and erasing or extinguishing coil 17 the voltage $U_5$ appearing across the capacitor 27 is delivered both to a triac 29 having a control electrode 30 as well as to the anode 31*a* of a thyristor 31 having a control electrode 32. The other terminal or pole of the triac 29 and the cathode 31*b* of the thyristor 31 are coupled with the minus collecting rail or bus bar 11 of the control mechanism 3.

In order to place the storage switch circuit 1 into its ON-state, it is necessary to deliver to the input terminal 15 of such storage switch circuit 1 a positive pulse during a predetermined minimum time duration T. As a result, the triac 29 is placed into its conductive state and the charge stored at the capacitor 27 decays in the form of a dampened oscillation. By virtue of the decaying alternating-current which then flows in the winding or coil 17, the ring core 5 is demagnetized so that the impedance Z becomes high-ohmic and the voltage at the terminal 20 increases. Consequently, the capacitor 24 is charged and the voltage $U_4$ appearing thereat switches, via the resistor 25 and the control electrode 9, the switching element 2 into its conductive state.

Now if there possibly occurs interruption of breakdown in the network voltage $U_N$ and the supply voltages $U_1$, $U_2$ and $U_3$, the ring core 5 still, however, remains in its demagnetized state, so that upon reoccurrence of the aforementioned voltages there is immediately again established the conductive state of the switching element 2 and therefore the ON-state of the storage switch circuit or system 1.

In order to be able to set the OFF-state of the storage switch circuit 1, it is necessary, on the other hand, to deliver a positive pulse to the input terminal 16 of the storage switch 1. As a result, the thyristor 31 ignites and there occurs a rapid discharge of the capacitor 27 across the recording- and erasing winding or coil 17. In this connection it is to be observed that in contrast to the previously described operation, discharge of the capacitor does not occur in the form of a dampened oscillation, rather in the form of an exponential decaying-direct current surge. By virtue of this direct-current surge through the winding 17 the ring core 5 is placed into its magnetically saturated state, the impedance Z therefore becomes low-ohmic, the voltage at the terminal 20 practically disappears, the switching transistor 23 blocks and the voltage $U_4$ disappears. Consequently, the switch or switching element 2 assumes its non-conducting state and the storage switch circuit 1 assumes its OFF-state. Both during interruption of the network voltage $U_N$ as well as also upon the reappearance of the network voltage $U_N$ and the supply voltages $U_1$, $U_2$ and $U_3$, the storage switch circuit remains in its OFF-state.

With the storage switch system or circuit 1 according to the described initial exemplary embodiment, the point in time of the transition from the OFF-state to the ON-state is dependent upon the point in time where the voltage $U_4$ exceeds a predetermined critical value. The transition to the ON-state can therefore occur with a random voltage value of the network voltage $U_N$, for instance also at or in the region of its maximum amplitude. As long as the load circuit is ohmic or inductive this does not have any adverse effects. On the other hand, if the storage switch system 1 acts upon a capacitive load, then in consideration of the surge load of the switch element 2 it is advantageous to shift the point in time of the ON-switching of the storage switch system 1 at least approximately to the region of a null crossover of the network voltage $U_N$.

Figure 2:
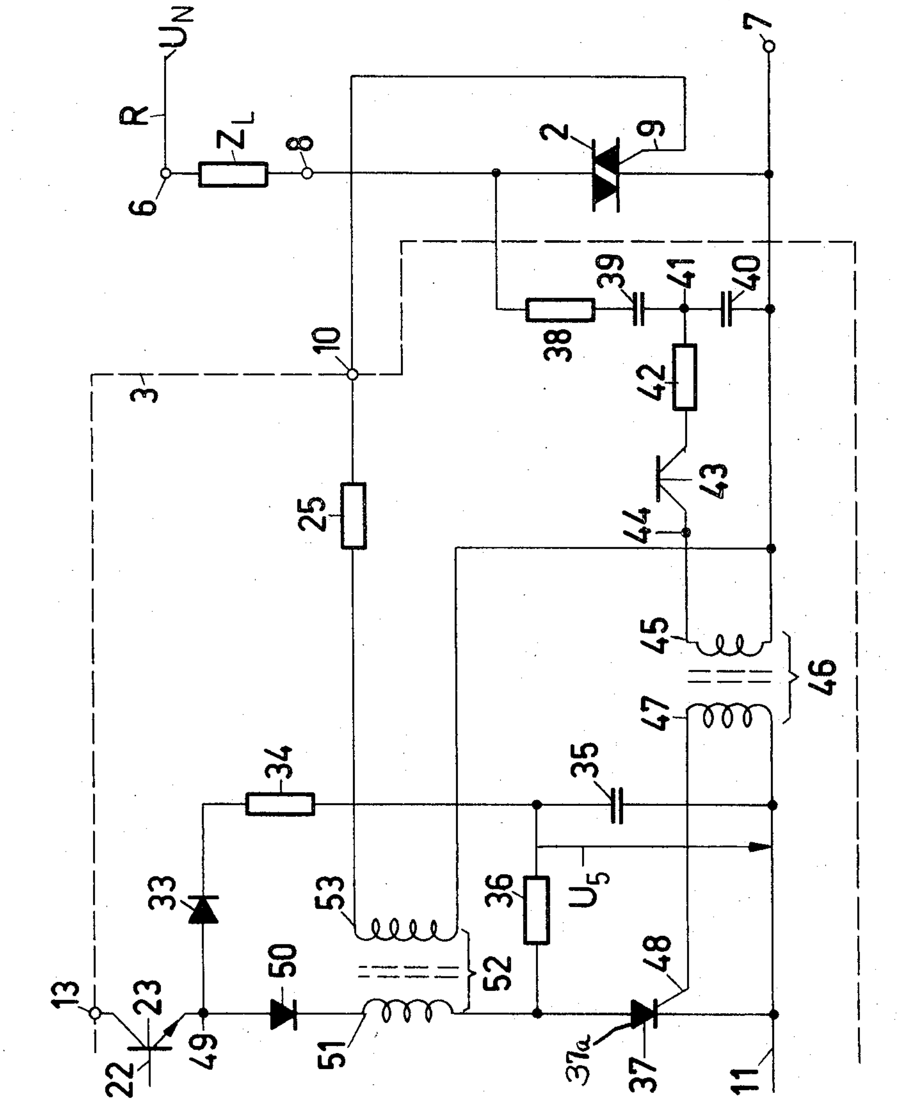
FIG. 2 is a circuit diagram of a second exemplary embodiment of storage switch system which is particularly suitable for use with capacitor load circuits.

A second exemplary embodiment of the invention will now be discussed in conjunction with FIG. 2, and which embodiment represents an advantageous further constructional manifestation of the invention and which is characterized by the features that the point in time of switching-on the storage switch system 1 automatically occurs at or near the region of the null crossover of the network voltage $U_N$, independent whether at this period of time there is present the corresponding control pulse at the terminal 15. This can be realized by modifying the control circuit 3. This modification is directed to that part of the control circuit 3 which follows the switching transistor 23. Hence, for convenience in illustration, there has only been depicted in FIG. 2 the modified part of such circuit together with the load circuit. Furthermore, it is to be understood that the same or analogous components have been designated in both FIGS. 1 and 2 with the same reference characters.

As already previously mentioned, a positive control pulse at the terminal 15 causes the switching transistor 23 to become periodically conductive. By means of a diode 33 and a resistor 34 a capacitor 35 is charged to the voltage $U_5$. The voltage $U_5$ appears via a resistor 36 at the anode 37*a* of a thyristor 37, yet this thyristor 37 initially is in its non-conductive state.

Arranged in parallel to the switching element 2 is a voltage divider consisting of the series circuit of a resistor 38, a capacitor 39 and a capacitor 40. From the location of the junction or terminal 41 of both capacitors 39 and 40 a resistor 42 is connected with one pole of a trigger diode 43, the other pole of which is electrically coupled with one end or terminal 44 of the primary winding 45 of a transformer 46. The aforementioned voltage divider 38–40 is dimensioned such that the trigger diode 43, which for instance can be the commercially available Motorola diode type-MPT 20, disclosed in Motorola Data Book, Fifth Edition, page 4.24, ignites at least approximately during null crossover of the network voltage $U_N$. As a result, the capacitor 40 suddenly discharges across the primary winding 45 of the transformer 46. The pulse which is thus generated at the secondary winding 47 of the transformer 46 is delivered to the control electrode 48 of the thyristor 37 and ignites such thyristor. The thyristor 37 has delivered thereto its holding current via the resistors 34 and 36. Since the thyristor 37 is in its conducting state, it is possible for a pulse-like current fo flow from the emitter 49 of the switching transistor 23, via a diode 50 and a primary winding 51 of a further transformer 52, to the thyristor 37. Now from the secondary winding 53 of the transformer 52, there is then delivered an alternating-current voltage via the resistor 25 to the output terminal 10 of the control circuit 3 and from that location to the control electrode 9 of the switch or switching element 2. As a result, this switching element 2 is placed into its conductive state and the storage switch circuit 1 into its ON-state. This occurs at least approximately at the point in time of null crossover of the network voltage $U_N$.

Switching-off of the switching element 2 occurs after, as already mentioned, the ring core of the storage element 3 has become magnetically saturated and the switching transistor 23 as a result blocked. The capacitor 35 then discharges and the voltage $U_5$ disappears. Also the thyristor 37 no longer receives any current via the resistor 34, so that also the voltage at the secondary winding 53 of the transformer 52 disappears. Consequently the switching element 2 assumes its non-conducting state and the storage switch circuit 1 is placed into its OFF-state.

Owing to the galvanic disconnection or separation which occurs for this second exemplary embodiment of the invention between the switching element 2 and the negative bus bar or collecting rail 11, it is possible to connect the terminal 7 either at the null or ground conductor 0 or at a further phase conductor S or T of a heavy-current network.

Figure 3:
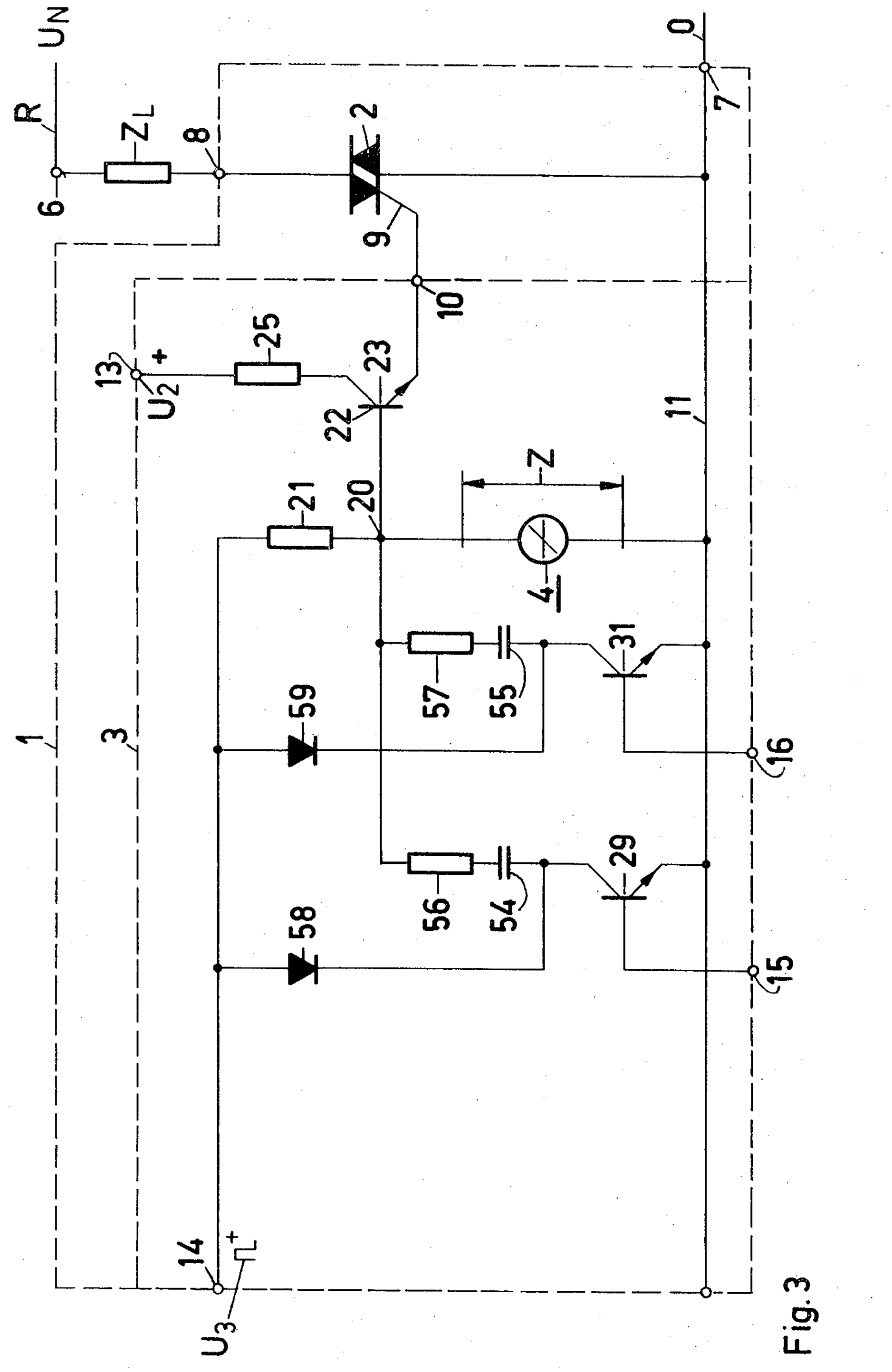
FIG. 3. is a circuit diagram of a third exemplary embodiment of storage switch system in which a control mechanism possesses a halogen-glass-memory or storage.

FIG. 3 illustrates a circuit diagram of a third exemplary embodiment of storage switch system wherein there is provided a control mechanism or circuit 3 having a halogen-glass storage or memory 4. Analogous to the firt exemplary embodiment of FIG. 1 here also the control mechanism or circuit 3 of FIG. 3 contains a voltage divider which is located between the terminal 14 and the negative bus bar or collecting rail 11, and embodies the resistor 21 and the impedance Z. This impedance Z is formed by the storage or memory 4 which, is this instance, constitutes a halogen-glass-storage or memory of the type mentioned in the previously listed publication. Such type storage or memory can be placed, by current pulses of a certain energy-time profile, either into a low-ohm range or a high-ohm range. In order to be able to generate such current pulses of predetermined intensity and predetermined course, there are provided, according to the circuit arrangement of FIG. 3, two capacitors 54 and 55. Both of these capacitors 54 and 55 can be charged via a respective one of the diodes 58 and 59 serving for mutual decoupling and which are connected between the terminal 14 and the associated capacitors 54 and 55 respectively. At the terminal 14 there appears a sequence of positive pulses, namely the voltage $U_3$. The capacitor 54 and 55 respectively are electrically connected via a respective resistor 56 and 57 and via the circuit junction or terminal point 20 with the base 22 of the switching transistor 23. The other terminal or pole of each capacitor 54 and 55 is connected via a respective switching transistor 29 and 31 with the negative bus bar or collecting rail 11. By means of a control pulse appearing at the terminal 15, it is possible to place the switching transistor 29 into its conductive state, resulting in discharge of the capacitor 54. In corresponding manner it is also possible to render conductive the switching transistor 31 by means of a control pulse appearing at the terminal 16, resulting in discharge of the capacitor 55. The thus produced current surges flow through the storage or memory 4. The dimensioning of the capacitor 54 and the resistor 56 and the capacitor 55 and the resistor 57 is chosen in accordance with the relevant data of the employed storage or memory 4 such that upon switching-through the switching transistor 29 this storage 4 is placed into its high-ohm state and upon switching-through the switching transistor 31 such storage is placed into its low-ohm state. Hence, the switching state of the switching or switch element 2 is controlled in a manner analogous to the first exemplary embodiment, so that no further discussion in this regard appears to be necessary. Since the storage 4 retains its high-ohm or low-ohm state respectively, after decay of the aforementioned current surge, it should be readily apparent that accordingly, after reoccurrence of the supply voltage $U_N$ which has been interrupted for a period of time, the switching element again assumes that state which it had prior to interruption of such voltage.

Figure 4:
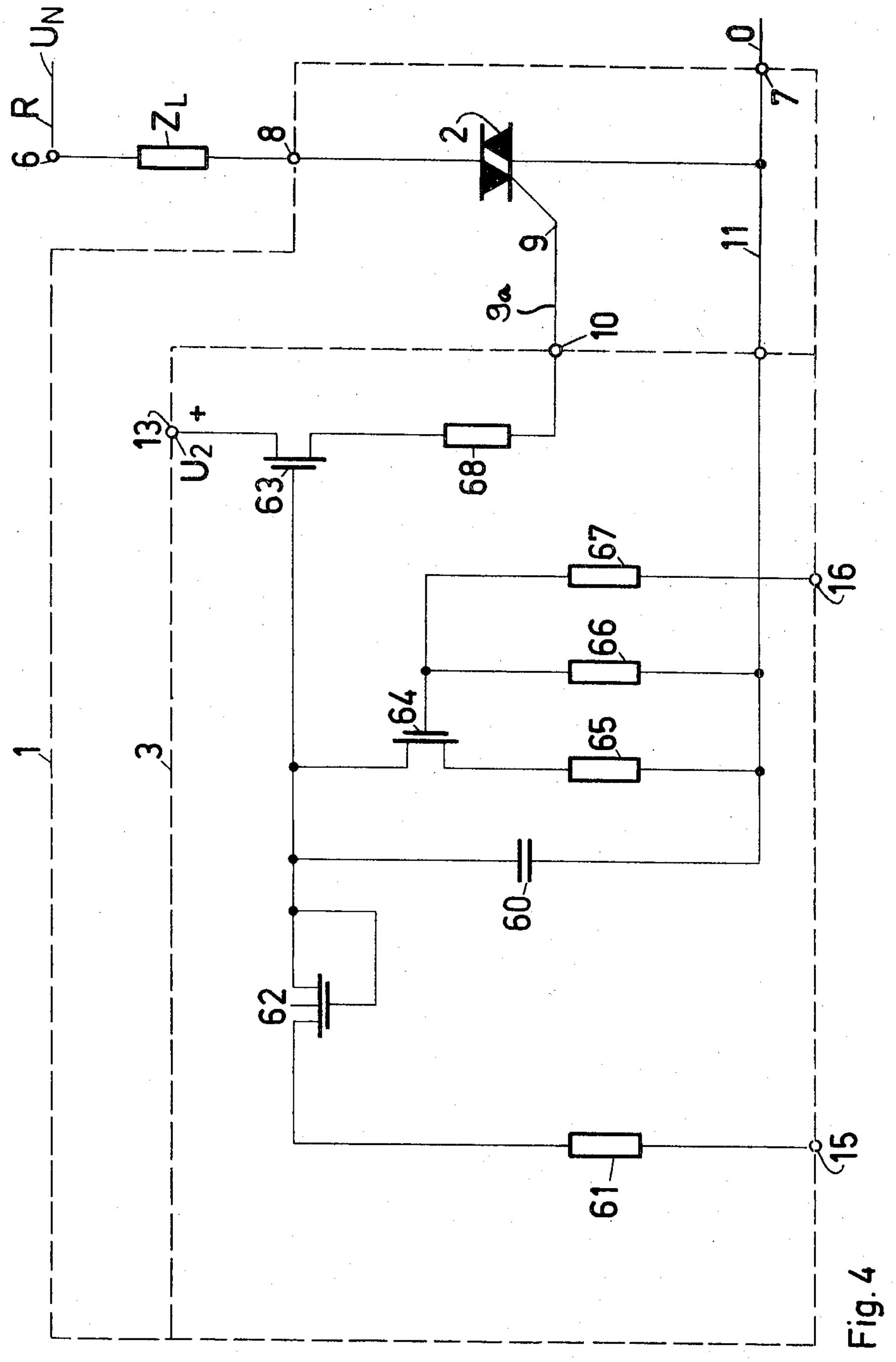
FIG. 4 is a circuit diagram of a fourth exemplary embodiment of a storage switch system in which a control mechanism embodies a capacitor as the storage or memory and such capacitor can be charged and discharged via MOS-field-effect transistors.

FIG. 4 illustrates a circuit diagram of a fourth exemplary embodiment of storage switch system or circuit 1, in which the control mechanism or circuit 3 employs as the storage or memory a capacitor 60 which can be charged and discharged via MOS-field-effect transistors. According to the fourth exemplary embodiment of the invention, the high-ohm characteristics of the control input of MOS-field-effect transistors together with a capacitor possessing high insulation resistance are employed for generating extremely high time-constants. Since in practice the supply voltage $U_N$ hardly ever is interrupted for more than a few hours, it is sufficient for the intended purposes to use time-constants in the order of 10 or more hours. Such time-constants can be faultlessly realized with suitable MOS-field-effect transistors and capacitors with high insulation resistance as same are available in accordance with present day technology in the electronics art. The control mechanism 3 of this fourth exemplary embodiment of FIG. 4 contains such type capacitor 60 which is charged via a MOS-field-effect transistor 62 by means of a pulse which is delivered to the terminal 15 and by means of a pulse delivered to the terminal 16 this capacitor 60 is discharged via a MOS-field-effect transistor 64. Suitable examples of MOS-field-effect transistors for purposes of the invention can be obtained, for instance, from the Motorola Company and are available on the market as type MFE 3003 of such concern. As the capacitor 60 there is suitable, for instance, a so-called electro-chemical capacitor of the type discussed in the previously mentioned publication.

Now if the capacitor 60 is charged by a control pulse appearing at the input terminal 15, then via the transistor 63 current flows from the terminal 13 across the resistor 68 to the output terminal 10 of the control mechanism or circuit 3 and from that location via the conductor 9*a* to the contol electrode 9 of the switching element 2. Consequently, the switching or switch element 2 and therefore the storage switch circuit 1 is shifted into its conductive state. Also in the case of interruption of the network voltage $U_N$, owing to the high-ohm characteristics of the transistors 62, 63 and 64 coupled with the capacitor 60, the charge of the latter is maintained for a long period of time, for instance more than 10 hours, so that upon reoccurrence of the network supply $U_N$ within this time span, current immediately again flows from the terminal 13 via the transistor 63 and the resistor 68 to the switching element 2 and again immediately places such back into the state which it assumed before interruption of the network voltage or power $U_N$. If, however, the capacitor 60 has been discharged by a control pulse appearing at the input terminal 16, then the capacitor of course also will remain in its discharged state when there occurs interruption in the network voltage or supply and upon reoccurrence of the network voltage $U_N$ no current flows from the terminal 13 via the transistor 63 and the resistor 68 to the switching element 2, so that such remains in its non-conductive state which it also assumed prior to interruption to the network voltage $U_N$.

The solution portrayed for the second exemplary embodiment of the invention constitutes a further manifestation of the invention explained in conjunction with FIG. 1. The further exemplary embodiments discussed in conjunction with FIGS. 3 and 4 constitute equivalent solutions for the invention disclosed in connection with FIG. 1. Of course, it should be readily understood and as will be apparent to those skilled in the art, still further equivalent solutions are of course possible without departing from the underlying concepts of the invention.

While there is shown and described present preferred embodiments of the invention, it is to be distinctly understood that the invention is not limited thereto, but may be otherwise variously embodied and practiced within the scope of the following claims.

What is claimed is:

1. A storage switch arrangement comprising a storage switch system incorporating an electronic switch element, a control mechanism operatively associated with the electronic switch element for at least temporarily storing the switching state of the storage switch system, a storage containing magnetizable material provided for said control mechanism, said storage retaining its storage state at least for a certain time duration even upon interruption of the power supply for the storage switch arrangement, said electronic switch element defining a first electronic switch element which is arranged in series with a load impedance, said electronic switch element having a control electrode, said control mechanism having an output, said control electrode being connected with the output of the control mechanism, a supply of AC-voltage, a collecting rail, said control mechanism embodying a voltage divider coupled with the AC-voltage supply and the collecting rail, said voltage divider comprising a resistor and an impedance, said impedance being formed by a reading coil on and a core which core can be magnetized and demagnetized and constituting said storage, a transistor having a control input, the voltage divider having a voltage divider junction, said voltage divider junction being electrically coupled with the control input of said transistor, a DC-voltage supply said transistor further having a collector and an emitter, the collector of the transistor, a DC-voltage supply, said transistor further ply, a capacitor, the emitter of such transistor being connected with one pole of the capacitor and the other pole of the capacitor being connected with the collecting rail, and wherein said emitter is also galvanically connected with the output of said control mechanism, a further DC-voltage supply, a recording- and erasing coil operatively associated with the magnetizable core, said recording- and erasing coil being arranged in a current circuit connected with a terminal leading to said further DC-voltage supply, said recording- and erasing coil being selectively connectable via a second switching element which passes current in both directions and via a third switching element which passes current only in one direction with the collecting rail, said second switching element receiving control pulses for the switching-in of the storage switch system and the third switching element receiving control pulses for switching-off of said first electronic switch element and therefore the storage switch system.

2. A storage switch arrangement comprising a storage switch system incorporating an electronic switch element, a control mechanism operatively associated with the electronic switch element for at least temporarily storing the switching state of the storage switch system, a storage provided for said control mechanism, said storage retaining its storage state at least for a certain time duration even upon interruption of the power supply for the storage switch arrangement, a load impedance, said electronic switch element defining a first electronic switch element having a control electrode and connected in series with said load impedance, said control mechanism having an output, said electronic switch element having a control electrode connected with the output of the control mechanism, said control mechanism incorporating a voltage divider, an alternating- current voltage supply and a collecting rail, said voltage divider being electrically coupled with the alternating current- voltage supply and the collecting rail, said voltage divider embodying a resistor and an impedance, said impedance being defined by a reading winding associated with a magnetizable and demagnetizable core constituting said storage, said voltage divider having a voltage divider junction, a first transistor having a control input, the control input of said first transistor being coupled with the junction of the voltage divider, said first transistor further incorporating a collector and an emitter, a direct-current voltage supply, a terminal carrying a direct-current voltage from the direct-current voltage supply, the collector of the transistor being connected with said terminal, a further direct-current voltage supply a recording- and erasing coil associated with said core, said recording- and erasing coil being located in a current circuit which is connected at a terminal carrying a further direct-current voltage of said further directcurrent voltage supply, said recording- and erasing coil being selectively connectable via a second switching element which can pass current in both directions and via a third switching element which can pass current in only one direction with said collecting rail, and wherein said second switching element has delivered thereto control pulses for the preparation of the switching-in of the thereto control pulses for the switching-off of the storage switch system, and wherein additionally from the emitter of said transistor a first current path leads via a diode, a primary winding of a first transformer and a thyristor to the collecting rail, and a second current path leads from said emitter via a further diode and a first resistor to a first pole of a capacitor, the other pole of said capacitor being connected to said collecting rail and via a second resistor in circuit with said first pole of said capacitor and via said thyristor likewise leads to the collecting rail, a further transformer having a primary winding and a secondary winding, said primary winding of said further transformer being connected via a trigger diode and a resistor and phase displacement means with the load impedance, and siad first transformer having a secondary winding connected with the output of said control mechanism with which there is also connected the control electrode of said first electronic switch element.

3. A storage switch arrangement comprising a storage switch system incorporating an elecrtonic switch element, a control mechanism operatively associated with the electronic switch element for at least temporarily storing the switching state of the storage switch system, a storage comprising an amorphous semiconductor provided for said control mechansim, said storage retaining its storage state at least for a certain time duration even upon interruption of the power supply for the storage switch arrangement, a load impedance, said electronic switch element defining a first electronic switch element located in series with said load impedance, said first electronic switch element having a control electrode, said control mechanism having an output, said control electrode being connected with the output of the control mechansim, means for supplying a direct-current voltage to a first terminal of the control mechanism and a pulse-shaped voltage to a second terminal of the control mechanism, a transistor having a base, collector and emitter, a resistor and a collecting rail, and wherein at the first terminal which is supplied with the direct-current voltage there is connected the collector of the transistor via said resistor, the emitter of said transistor being connected via the output of the control mechanism with the control electrode of said first electronic switch, a voltage divider having a junction, said voltage divider being connected between said second terminal carrying the pulse-shaped voltage and said collecting rail, said transistor including a control input connected in circuit with the junction of the voltage divider, said voltage divider consisting of a resistor and an impedance, said storage defining said impedance, said storage having associated therewith a first storage capacitor and a second storage capacitor, each said capacitor being connected via a respective associated diode with said second terminal carrying the pulseshaped voltage and via a respective resistor with said voltage divider junction, and wherein the pole of the first capacitor connected with the associated diode is connected via a first switching transistor having a control input and the pole of the second capacitor connected with the associated diode is connected by a second switching transistor having a control input with the collecting rail, and control input of said first switching transistor being connected with a connection terminal for the infeed of switch-on pulses for the storage switch system, and said control input of said second switching transistor being connected with a connection terminal for the infeed of switch-off pulses for the storage switch system.

4. The storage switch arrangement as defined in claim 3, wherein the amorphous semiconductor is a halogen-glass-semiconductor.

5. A storage switch arrangement comprising a storage switch system incorporating an electronic switch element having a control electrode, a control mechanism operatively associated with the electronic switch element for at least temporarily storing the switching state of the storage switch system, a storage provided for said control mechanism, said storage retaining its storage state at least for a certain time duration even upon interruption of the power supply for the storage switch arrangement, the control mechanism associated with the electronic switch element comprises an RC-element defining the storage, the ohmic part of said RC-element is essentially formed by the input resistance of a MOS-field-effect transistor which is galvanically coupled with the control electrode of said electronic switch element.

6. The storage switch arrangement as defined in claim 5, wherein the capacitor of the RC-element comprises an electrochemical capacitor.

7. A storage switch arrangement comprising a storage switch system incorporating an electronic switch element, a control mechanism operatively associated with the electronic switch element for at least temporarily storing the switching state of the storage switch system, a storage provided for said control mechanism, said storage retaining its storage state at least for a certain time duration even upon interruption of the power supply for the storage switch arrangement, the control mechanism associated with the electronic switch element comprises an RC-element defining the storage, wherein there is associated with the RC-element a charging current circuit containing a MOS-field effect transistor and a discharging current circuit containing a further MOS-field-effect transistor, wherein the charging current circuit has delivered thereto a switch-on pulse for the storage switch system and the discharge circuit a switch-off pulse for the storage switch system.

* * * * *